United States Patent Office 3,161,497
Patented Dec. 15, 1964

3,161,497
TOXICANT COMPOSITION COMPRISING CORN
GLUTEN AS CARRIER
Ray D. Amburn, Elsie, Mich.
(11420 Canal Road, Utica, Mich.)
No Drawing. Filed Mar. 28, 1963, Ser. No. 268,563
12 Claims. (Cl. 71—2.6)

This invention relates to a toxicant composition and more specifically to a toxicant combination with an organic carrier. Still more specifically, this invention relates to comminuted corn and its use as a carrier for herbicides, pesticides, fungicides, and related toxicants for various agricultural purposes.

The comminuted kernels of corn of this invention are particularly adaptable as a carrier for water-soluble or emulsifiable toxicants which are absorbed and adsorbed on the surface of the corn particle and are released to the soil readily under specified conditions of heat and moisture. Alternatively, the granular particles of corn as prepared in accordance with this invention are used in combination with a urea binder which facilitates the use of water-insoluble toxicants which are difficult to distribute over an area as solutions or aqueous emulsions.

Heretofore various inorganic and organic media have been employed as impregnants or inert carriers, among which may be included clays, mica, vermiculite, perlite, and various other forms of siliceous materials which are inert with respect both to the active chemical and the soil. In addition to the inorganics, organic materials, such as corncobs, coconut shells, bark, and similar vegetation have been used as carriers for toxicants. These materials have some disadvantages in that, for example, siliceous materials, such as the clays or vermiculite, after continuous use have a tendency to build up a siliceous film ranging as high as $\frac{1}{16}$ inch over the soil which prevents the penetration of moisture, water, and air nitrogen which are necessary to the healthful growth of plants and various types of vegetation.

In contrast, however, the granular particles of corn, even though used in a small proportion over large acreage, help to build up the humus and act as a nutrient, which is substantially effective over a period of time. Most of the known solid carriers do not have the advantages of the granular corn particles which are extracted from kernels of corn and dehydrated to the extent that they are an absorbent for the toxicant which is released readily under certain moisture and temperature conditions. The release of the chemical from the corn can be controlled to the point where the herbicidal or pesticidal action can be prolonged over a period up to 12 weeks instead of being supplied immediately to the soil as is the case with most of the known inert solid carriers. One of the advantages of organic carriers is that the rate of decomposition is known and the chemical action can be prolonged for the necessary period of time to permit the plants being protected to grow sufficiently to care for themselves. It is advisable also to avoid the build-up or carry-over of the toxicant from one season to another and this can be done by using an organic carrier which will decompose within a specified period.

Other forms of organic carriers, e.g., corncobs, coconut shells, bark, and other forms of vegetation, while having known decomposition rates are not applied easily in the same manner as the corn gluten. Most of these other materials are in powder or flake form so that they do not have the flowability or density of the corn gluten and for this reason cannot be sprayed from high altitudes and obtain uniform distribution. The corn gluten obtained from the kernel, after a dry grind was found to have a density ranging from 30 to 40 pounds per cubic foot which makes is adaptable for applying in various ways with little difficulty.

The use of other corn products, or even wheat dust which is essentially aspirated particles, has not been found satisfactory in that they do not have the physical and chemical characteristics which make the corn gluten product particularly suitable as a carrier for highly active chemicals or toxicants. In particular the wheat dust and other corn products do not have the granular particles with sufficient fluidity or absorption power to make the product applicable as an effective carrier. These materials are somewhat similar to the hull or bran, which is discarded from the crushed corn, since they do not have the bulk density comparable to that of the gluten portion of the kernel.

Accordingly, as distinguished from other forms of solids carriers, the kernel or corn, and more specifically the gluten portion of the kernel, was found to be particularly adaptable as a carrier for both water-soluble and non-water soluble fungicides, herbicides, pesticides, insecticides, fertilizers, and mixtures thereof, hereinafter referred to as toxicants. The gluten portion of the kernel used as a carrier excludes any part of the corn plant together with the starch, germ, and hull, and leaving that portion which comprises essentially the protein and high density starch. The granular particles of the gluten, when prepared in the prescribed manner and dehydrated to a point where the final product has less than 12 percent, and preferably less than 10 percent, by weight of moisture, have exceptional qualities for absorbing the water-soluble toxicants or adsorbing the insoluble toxicants when used in combination with a urea binder.

Accordingly, it is an object of this invention to provide ground kernels of corn, and particularly the gluten portion thereof, as a decomposable carrier for herbicides, fungicides, pesticides, insecticides, fertilizers, and mixtures thereof.

It is still another object of this invention to provide a carrier which has a definite rate of decomposition, which will absorb a sufficient amount of toxicant to be released subsequently in the soil over a period ranging up to about 12 weeks, at which time the carrier decomposes.

It is still another object of this invention to provide a corn product as a carrier, having a particular particle size ranging from 30 to 60 mesh and a bulk density of 30 to 40 pounds per cubic foot, the density and particle size of the corn product making it adaptable to being distributed over large acreages from a high altitude.

It is a still further object of this invention to provide a corn product as a carrier for organic toxicants so that because of the known composition its rate of deterioration can be determined and thus provide distribution of the active chemical in the soil over a definite period of time.

It is a still further object of this invention to provide a corn product and more specifically a corn gluten as a carrier for organic and inorganic toxicants, the gluten-starch portion of the kernel being obtained by a dry milling process which excludes all products having a density lighter than 30 pounds per cubic foot and a particle size greater than 60 mesh.

It is a still further object of this invention to provide a corn product as a carrier for toxicants which uses a urea compound as a binder in the combination and which in addition to the toxicant acts as a fertilizer in the soil.

These and other objects will become apparent from the further and more detailed description of the invention to follow.

It has been discovered that a corn product, and more specifically corn gluten, has unique chemical and physical characteristics which make it adaptable as a carrier for such toxicants as herbicides, fungicides, pesticides, insecticides, and fertilizers, or any mixtures of these or related materials. The corn gluten referred to is essentially that portion of the kernel excluding the starch, germ, and the skin or hull. This portion of the kernel is dry milled to a particle size ranging from 8 to 60 mesh, preferably from 30 to 60 mesh, and has a bulk density ranging from 30 to 40 pounds per cubic foot, more specifically 34 to 40 pounds per cubic foot. The corn gluten when obtained from the kernel in the manner described is dehydrated to a point where the particles have a moisture content less than 12 percent, and preferably less than 10 percent. This dehydration or removal of moisture enables the particles to absorb the toxicant in a concentration ranging up to about 35 percent by weight of the composition; that is, more specifically the corn carrier product may consist essentially of 1 to 35 percent by weight of toxicant and 65 to 99 percent by weight of the corn gluten.

Still further, it was found that in handling the water insoluble or powdered toxicants, the active chemical could be bound to the particles of corn with a urea compound as the binder. The urea may be used in amounts ranging up to 15 percent by weight, preferably less than 10 percent by weight of the total composition. In most instances, however, the amount of the urea binder to be utilized will depend upon the concentration of the toxicant. Thus, for example, the binder will range up to about 50 percent, preferably less than 25 percent of the amount of toxicant being used with the corn carrier. In instances where the toxicant ranges up to 35 percent by weight of the total composition, the binder likewise will range up to approximately 18 percent by weight of the total composition or about 50 percent by weight of the toxicant.

GLUTEN CORN

The corn gluten which is the constituent or carrier of this invention is that part of the commercially shelled corn which remains after the extraction of the starch, germ, and the hull or skin. The gluten which is the major protein element of the kernel is concentrated in the hard starch portion as distinguished from the soft starch portion, and comprises approximately 25 percent of the kernel, the remainder being the water and oil derived from the germ and the kernel as a whole. The various processes for refining corn, particularly the wet milling process, have been disclosed, but for purposes of this invention simple dry milling is sufficient to remove the powdered soft starch portions, the hulls, and the germ so as to obtain only the hard starch gluten portion which is in a granular form. This granular corn gluten should have a density ranging from about 30 to 40 pounds per cubic foot.

The term "corn gluten" for purposes of this invention is intended to include that portion of the kernel which excludes substantially all of the starch, particularly the soft starch, the germ, and the skin or hull. The portion used as the carrier, or the corn gluten, is obtained by a dry grinding process where the lighter fractions, i.e., the hulls, are removed by air aspirators and the soft starch passes through a 60 mesh screen, leaving the gluten portion of the kernel with a particle size of 8 to 60 mesh and a density of 30 to 40 pounds per cubic foot.

The rolling mills employed in crushing the kernels of corn are referred to as impact machines or rolling mills having a corrugated or serrated stationary roll which breaks open the kernel, permitting the soft starch portion to powder, which is separated from the remaining part of the corn by being passed through a 60 mesh screen.

The air aspirators used in combination with the mills separate the hulls, germ, and lighter fractions leaving the gluten corn. It is essential here to distinguish the gluten corn as obtained by the above process from other corn products, such as cornmeal, corn dust, etc. The corn gluten has a substantially lesser amount of starch, which enables it to be mixed with an aqueous media without forming a paste and becoming impractical as a carrier.

The main portion of the starch is removed in a roller mill which is capable of pressures ranging up to 100 pounds per square inch. It is the gluten or starch-gluten portion of the kernel which, when obtained in the above manner, is found to be satisfactory as a carrier for the toxicants. The separated gluten portion of the kernel is then dehydrated to the extent that there is less than 12 percent, and preferably less than 10 percent, of moisture in the final particles. The moisture can be removed in conventional dehydrating units, either by an air or vacuum oven at elevated temperatures. Thus, for example, moisture can be removed by subjecting the particles to an air oven at temperatures of 185° C. or by utilizing a vacuum oven at 95° C. to 100° C. for a longer period of time.

To lessen problems of decomposition or interaction between the constituents of the corn, however, it is advisable to remove the moisture by drying in a vacuum oven at temperatures of 80° C. which minimizes the decomposition problem. This dehydration may take place before the particles are ground to the required size or in some instances the moisture may be removed after grinding. This is true particularly in instances where the moisture content is required to be less than 5 percent. The importance of removing moisture in excess of 12 percent, for example, is to provide a carrier which is capable of withstanding the presence of moisture, particularly when in contact with nitrogen, in order to avoid deterioration. It has been found that where the corn product retains an excess amount of moisture, the shelf life is decreased considerably due to the fact that when subjected to heat and small amounts of moisture, the nitrogen which may be present in the urea binder could cause the particles to deteriorate and break down while in storage. Thus, it is important to prevent such deterioration by limiting the moisture to less than 12 percent by weight to obtain shelf life in excess of two years or more.

The above-described corn particles are utilized as a carrier by impregnating them with an active chemical or toxicant. Most of the toxicants presently known are water-soluble and can be put into solution and sprayed or adsorbed by the corn in any one of several procedures. This may be accomplished, for example, by preparing an aqueous solution of the toxicant which then is sprayed uniformly on the granular corn so as to obtain a mixture of the toxicant and corn in prescribed proportions. It is obvious, however, that the precise method by which the toxicant is mixed with the carrier is not of any real importance except that it should be uniformly absorbed by the particles so that the final product is of uniformly high quality. It is because of the previously unknown and unrecognized properties of this particular constituent of the corn kernel, as described, that intimate mixtures of the active chemical and granular corn product function as an agricultural material substantially superior to any of those presently known.

The active chemicals or toxicants referred to as coming within the scope of this invention include herbicides, pesticides, fungicides, insecticides, and any mixtures thereof, and some of the fertilizers which are compatible with the toxicants. The invention is adapted particularly to the use of herbicides and fungicides which are in themselves well known chemicals but are particularly useful when applied on gluten corn as the carrier.

Typical examples of the herbicides, particularly the water solubles, includes the following:

Ferrous sulfate heptahydrate
Potassium cyanate
Sodium arsenite
4-chloro-2-methyl-phenoxyacetic acid
2,4-dichlorophenoxyacetic acid
2,4,5-trichlorophenoxyacetic acid
Sodium 2-(2,4-dichlorophenoxy)ethyl sulfate
a-(4-chloro-2-methylphenoxy)propionic acid
a-(2,4,5-trichlorophenoxy)propionic acid
y-(2,4,5-trichlorophenoxy)butyric acid 2,3,6-trichlorophenylacetic acid
3-amino-2,5-dichlorobenzoic acid
Sodium aa-dichloroproprionate
2-chloroallyl-NN-diethyl-dithiocarbamate
2-methyl-4,6-dinitrophenol
2-s-butyl-4,6-dinitrophenol
3-amino-1,2,4-triazole
Disodium 7-oxabicyclo-(2,2,1)heptane-2,3-dicarboxylate
1,2,3,6-tetrahydro-3,6-dioxopyridazine In addition to the herbicides, organic pesticides, such as lead arsenate, copper palmetto arsenite, Paris green, copper lauro arsenite, and copper stearo arsenite, have been found useful. However, while the water-soluble toxicants are put into aqueous solution and absorbed by the particles of corn gluten, the powder toxicants, which are not water soluble, may be covered over the particles using urea binder. Urea, and more specifically urea condensates with furfural alcohol or furfural aldehydes, are good binders for this purpose in that they do not tend to cake the particles and are friable to the extent that they can be put readily into a highly fluid state and then put into solution, forming a paste to which the powdered or granular toxicants can be added, and the paste subsequently applied to the granular corn. These urea products have as high as 42 percent by weight of nitrogen, depending upon the relative proportions of the aldehyde or alcohol which condenses with the urea forming the resinous composition. In addition to condensing the urea with furfural aldehylde or alcohol, others, such as paraformaldehyde, acetylaldehyde, benzylaldehyde, may be used, keeping the relative proportions of the urea and aldehyde or alcohol so as to obtain a final product which is substantially water soluble. Moreover, when considering the nitrogen content imparted to each particle of corn, which is a source of fertilizer, the rate of degradation of the urea condensate binder can be modified to coincide with the decomposition rate of the corn, so as to obtain effective release of the chemical and thus obtain control of the results intended.

Various other types of resinous binders may be obtained by condensing alcohols or aldehydes with, in addition to the ureas, the amines, amyl amines, guanidines, burets, cyanamides, thioureas, etc. The combination of the binder with the corn product is apropos to the application of many different biological toxicants and particularly to the herbicides and pesticides, or other types of biocides which regulate the growth of plants. These toxicants which are adapted particularly to be used with the binder include the water-insoluble powders or emulsions and include such material as:

Water-insoluble powders:
- Calcium cyanamide
- 3,5-dimethyl tetrahydro-1,3,5,2H-thiadiazine-2-thione
- 1,3-di(2,2,2-trichloro-1-hydroxyethyl) urea
- NN-dimethyl-N'-phenylurea
- N-(3,4-dichlorophenyl)-N'N'-dimethylurea
- N-butyl-N'-(3,4-dichlorophenyl)-N-methylurea
- N-(p-chlorophenyl) - N'N' - dimethylurea trichloroacetate
- 2-chloro-4,6-bis-(isopropylamino)-1,3,5-triazine
- 2,4-bis(ethylamino)-6-methoxy-1,3,5-triazine
- 2,6-dichlorobenzonitrile
- N-1-napththylphthalamic acid Non-water-soluble liquid herbicides:
- 4-chlorophenoxyacetic acid
- isopropylcarbanilate
- 4-chlorobut-2-ynyl-m-chlorocarbanilate
- 2-chloroallyl-NN-diethyl-dithiocarbamate
- 2,3-dichloroallyl-di-isopropylthiocarbamate
- N-diallyl-a-chloroacetamide
- N-cyclooctyl-N'N'-dimethylurea
- 2-chloro-r - diethylamino - 6 - isopropylamino - 1,3,5-triazine
- Pentachlorophenol

- 2-(2,4,5-trichlorophenoxy) - ethyl - aa - dichloropropionate

Typical illustrations of the granular corn as a carrier for toxicants, together with a urea binder are illustrated in the following examples:

*Example I*

| | Percent by weight |
|---|---|
| Granular gluten corn (10–60 mesh) | 50–80 |
| Toxicant (active chemical in aqueous media ranges from 5–76 percent by weight of the solution) | 20–50 |

*Example II*

| | |
|---|---|
| Granular gluten corn (10–60 mesh) | 50–80 |
| Water-insoluble toxicant | 15–40 |
| Urea-resin binder | 5–10 |

*Example III*

| | |
|---|---|
| Granular gluten corn (10–60 mesh) | 60–80 |
| Herbicide in aqueous solution (active chemical range 5–75 percent of the solution) | 20–40 |

*Example IV*

| | |
|---|---|
| Granular gluten corn (30–60 mesh) | 60–80 |
| Water-insoluble herbicide | 15–35 |
| Urea-alcohol resin binder | 1–10 |

*Example V*

| | |
|---|---|
| Granular gluten corn (30–60 mesh) | 90 |
| O-(2,4-dichlorophenyl)-O-methylisopropyl phosphoroamide thiocate | 10 |

*Example VI*

| | |
|---|---|
| Granular gluten corn (30–60 mesh) | 80 |
| 1,3-di(2,2,2-trichloro-1-hydroxyethyl) urea | 15 |
| Urea-furfural alcohol binder | 5 |

*Example VII*

| | |
|---|---|
| Granular gluten corn (30–60 mesh) | 85 |
| DDT (dichloro-diphenyldichloro ethane) (in aqueous media) | 15 |

*Example VIII*

| | |
|---|---|
| Granular gluten corn (10–30) | 85 |
| 2,4-bis(ethylamino-6-methoxy-1,3,5-triazine) | 13 |
| Urea furfural aldehyde condensate binder | 2 |

*Example IX*

| | |
|---|---|
| Granular gluten corn (30–60 mesh) | 90–99 |
| Dimethyl ester of tetrachloro terephthalic acid | 0.25–10 |

*Example X*

| | |
|---|---|
| Granular gluten corn (30–60 mesh) | 94–98 |
| O-2,4-dichlorophenyl-O-methylisopropyl phosphoro amido thiocate | 2–6 |

The water-soluble herbicides, pesticides, etc., herein referred to as toxicants are made up in aqueous solutions which are absorbed by the corn particle, either by dipping the corn into the aqueous media or by spraying the particles sufficiently to obtain a uniformly coated particle. The excess water is removed by air dryers leaving the active chemical absorbed on the corn.

The water-insoluble toxicants are mixed with the urea binder to obtain a pastelike adhesive mixture which is then mixed with the corn particles in the required proportion, to obtain a product which is completely friable and uniformly coated with the active chemical.

The urea binders referred to are condensation products which can be obtained by methods known in the resin art. Typical binders are prepared, for example, by utilizing approximately two parts by weight of a 40 percent furfural alcohol aqueous solution, condensed with approximately one part by weight of urea in the presence of an acid catalyst, such as sulfuric acid. The product obtained is a highly viscous fluid material. The urea binders in addition to adding nitrogen to the soil facilitates the adherence of the particles to the plant or other areas being treated due to the adhesive nature of the binder. Nevertheless the granular particles of treated corn are sufficiently friable or have a high degree of flowability which enables them to be spread over a large area with conventional spreaders without clogging or damaging the equipment. The density of the corn product is sufficient to enable it to be dropped or spread from high altitudes without encountering the problem of having the carrier taken by the wind as is the case with the use of aqueous sprays, thus resulting in non-uniform treatment.

Corn being one of the largest U.S. agricultural crops, because of its large yield and relatively low cost lends itself to use as a carrier for the dispersion of active chemicals over the smallest lawn or the largest acreage. This corn product builds up over a period of time and becomes part of the soil and thus in addition to treating the area for pests and weeds, the soil is fertilized by the nutrients of the corn. While it may be insignificant in that the amount used is somewhat limited, nevertheless over extended periods of time it has a tendency to build up the fertilizing constituents in the soil and more important, avoids the disadvantages incurred by using inert materials, such as clay, which when built up forms a crust which inhibits the penetration of moisture and air into the soil.

This application is a continuation-in-part of application, Serial No. 256,242, filed February 5, 1963, now abandoned.

While this invention has been described with reference to specific examples, it is to be understood that the invention is not intended to be limited to such examples, except as recited hereinafter in the appended claims.

The invention claimed is:

1. A chemically active composition consisting essentially of a particulate organic carrier and an effective amount of a toxicant on said carrier, said carrier characterized as being substantially corn gluten obtained from comminuted kernels of corn and having a particle size ranging for about 10 to 60 mesh, said toxicant being selected from the group consisting of herbicides, fungicides, insecticides, and mixtures thereof.

2. The composition of claim 1 further characterized in that an effective amount of the toxicant ranges from about 0.25 to 35 percent by weight of the carrier.

3. The composition of claim 1 further characterized in that the corn gluten is substantially free of the starch, hull, and germ.

4. The composition of claim 1 further characterized in that the corn gluten carrier has a water content of less than 12 percent by weight.

5. The composition of claim 1 further characterized in that the toxicant is a herbicide.

6. The composition of claim 5 further characterized in that the herbicide is a dimethyl ester of tetrachloroterephthalic acid, and ranges from 0.25 to 5.0 percent by weight of the carrier.

7. The composition of claim 1 further characterized in that the toxicant is water soluble and ranges from 0.25 to 10.0 percent by weight of the carrier.

8. A chemically active composition consisting essentially of a particulate carrier and an effective amount of a toxicant bound to said carrier with an adhesive proportion of a substantially water soluble resinous binder, said carrier characterized as being substantially corn gluten obtained from kernels of corn, said toxicant being selected from the group consisting of herbicides, fungicides, insecticides, and mixtures thereof, said binder being a reaction product of a condensation reaction of urea and a material selected from the group consisting of furfural alcohol, furfural aldehyde, paraformaldehyde, acetylaldehyde, and benzylaldehyde.

9. The composition of claim 8 further characterized in that the particle size of the corn gluten carrier ranges from about 10 to 60 mesh and is essentially free from the starch, hull, and germ.

10. The composition of claim 9 further characterized in that an effective amount of the toxicant ranges from about 0.25 to 35 percent by weight of the carrier.

11. The composition of claim 10 further characterized in that the adhesive proportion of the resinous binder ranges from about 1 to 10 percent by weight of the total composition.

12. The composition of claim 8 further characterized in that the toxicant is a water insoluble compound ranging from about 0.25 to 35 percent by weight of the total composition.

References Cited in the file of this patent

UNITED STATES PATENTS

| | | |
|---|---|---|
| 2,585,356 | Wagner | Feb. 12, 1952 |
| 2,890,151 | White | June 9, 1959 |
| 2,974,030 | Geary | Mar. 7, 1961 |
| 3,030,734 | Brickey | Apr. 24, 1962 |
| 3,056,723 | Galloway | Oct. 2, 1962 |
| 3,074,845 | Geary | Jan. 22, 1963 |